US010161509B2

United States Patent
Beck et al.

(10) Patent No.: US 10,161,509 B2
(45) Date of Patent: Dec. 25, 2018

(54) HYDRAULIC CONTROL DEVICE FOR AN AUTOMATIC TRANSMISSION

(71) Applicant: ZF Friedrichshafen AG, Friedrichshafen (DE)

(72) Inventors: Stefan Beck, Eriskirch (DE); Christian Sibla, Eriskirch (DE); Christoph Margraf, Markdorf (DE); Peter Ziemer, Tettnang (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 365 days.

(21) Appl. No.: 15/029,796

(22) PCT Filed: Sep. 17, 2014

(86) PCT No.: PCT/EP2014/069758
§ 371 (c)(1),
(2) Date: Apr. 15, 2016

(87) PCT Pub. No.: WO2015/055366
PCT Pub. Date: Apr. 23, 2015

(65) Prior Publication Data
US 2016/0230880 A1 Aug. 11, 2016

(30) Foreign Application Priority Data
Oct. 17, 2013 (DE) .................. 10 2013 221 035

(51) Int. Cl.
*B60K 20/00* (2006.01)
*F16H 61/00* (2006.01)
*F16H 61/02* (2006.01)

(52) U.S. Cl.
CPC ......... *F16H 61/0269* (2013.01); *B60K 20/00* (2013.01); *F16H 61/0021* (2013.01);
(Continued)

(58) Field of Classification Search
CPC ......... B60K 20/00; B60K 6/383; F16H 61/16; F16H 2061/165; F16H 61/18; F16H 61/0021; F16H 61/0269; F16H 61/0267
See application file for complete search history.

(56) References Cited

U.S. PATENT DOCUMENTS 4,828,452 A * 5/1989 Bolitho .................. B60F 1/043
105/215.2
5,199,313 A    4/1993 Muller
(Continued)

FOREIGN PATENT DOCUMENTS

AT    186976 B    10/1956
DE    677080 A    6/1939
(Continued)

OTHER PUBLICATIONS

German Search Report DE102013221035.3, dated Aug. 19, 2014, (8 pages).
(Continued)

*Primary Examiner* — William Kelleher
*Assistant Examiner* — Gregory T Prather
(74) *Attorney, Agent, or Firm* — Dority & Manning, P.A.

(57) ABSTRACT

A hydraulic control device for controlling multiple torque-transferring shift elements of an automatic transmission, where each of the shift elements features at least one hydraulic actuator, which includes one actuating pressure chamber, at least one stop valve and at least one hydraulic shift device with multiple pressure adjusting devices connected to the different shift elements. Thereby, the stop valve is configured and arranged in such a manner that the actuators of at least two shift elements are hydraulically connectable to the pressure adjusting devices through a common stop valve. In a first shifting position, all actuating pressure chambers of the at least two shift elements are tightly sealed by the stop valve. In a second shifting position,
(Continued)

all actuating pressure chambers of the at least two shift elements are connected through the stop valve to the pressure adjusting device allocated to the respective shift element.

18 Claims, 5 Drawing Sheets

(52) U.S. Cl.
CPC ..... *F16H 61/0267* (2013.01); *F16H 61/0276* (2013.01); *F16H 2061/0279* (2013.01)

(56) References Cited

U.S. PATENT DOCUMENTS

| | | | |
|---|---|---|---|
| 5,337,564 | A | 8/1994 | Bakke et al. |
| 6,544,139 | B1 | 4/2003 | Gierer et al. |
| 6,631,651 | B2* | 10/2003 | Petrzik ............... F16H 61/0025 184/27.2 |
| 7,527,071 | B2 | 5/2009 | Albrecht et al. |
| 8,348,634 | B2 | 1/2013 | Ertl |
| 2002/0060099 | A1* | 5/2002 | Takenaka ............... B60K 6/365 180/65.1 |
| 2005/0205138 | A1 | 9/2005 | Sowul et al. |
| 2006/0091340 | A1 | 5/2006 | Stevenson |
| 2011/0077124 | A1* | 3/2011 | Moorman ........... F16H 61/0021 477/152 |
| 2016/0069451 | A1* | 3/2016 | McDonough ....... F16H 61/0021 74/473.11 |
| 2016/0230880 | A1* | 8/2016 | Beck ................... F16H 61/0269 |
| 2016/0265657 | A1* | 9/2016 | Herrmann ........... F16H 61/0206 |
| 2018/0080507 | A1* | 3/2018 | Smid ................... F16H 61/0021 |

FOREIGN PATENT DOCUMENTS

| | | |
|---|---|---|
| DE | 1223214 A | 8/1966 |
| DE | 2434345 C2 | 1/1976 |
| DE | 3048229 C2 | 7/1982 |
| DE | 4124384 C1 | 1/1993 |
| DE | 69103628 T2 | 4/1995 |
| DE | 19815788 A1 | 10/1999 |
| DE | 19858541 A1 | 6/2000 |
| DE | 19916040 A1 | 10/2000 |
| DE | 10020187 A1 | 10/2001 |
| DE | 10205411 A1 | 8/2003 |
| DE | 102004028039 B3 | 4/2005 |
| DE | 102005051606 A1 | 5/2006 |
| DE | 102005057004 B3 | 4/2007 |
| DE | 102006033747 B3 | 1/2008 |

OTHER PUBLICATIONS

International Search Report (English Translation) PCT/EP2014/069758, dated Jul. 31, 2015. (2 pages).

* cited by examiner

HYDRAULIC CONTROL DEVICE FOR AN AUTOMATIC TRANSMISSION

FIELD OF INVENTION

The invention relates to a hydraulic control device and an automatic transmission.

BACKGROUND

With automatic transmissions for motor vehicles, as is known, for example, from DE 198 58 541 A1, the transmission stages are adjusted by frictional-locking shift elements, which are to be understood in the following as frictional-locking clutches or brakes. In the disclosed automatic transmission, clutches, which connect two rotatable elements to each other in a torque-proof manner, and brakes, which connect in a torque-proof manner a rotatable element with a fixed element or an element connected in a torque-proof manner to the transmission housing, are formed as multi-disk shift elements. In this case, the actuation of the shift elements takes place hydraulically; i.e., by means way of actuators in the form of pistons/cylinder units, which are subjected to pressurized oil. The pressurized oil is applied using a motor-driven pump as a pressure source and, throughout the entire operating period of the automatic transmission, must be maintained at a pressure level that produces a compression force between the multi-disks in the shift element that is sufficient for the transfer of torque. The energy used to generate pressure by means of the hydraulic pump must be applied by the engine of the motor vehicle, such that the generation of hydraulic power increases fuel consumption and CO2 emissions or, because of the power losses, reduces the energy available to use to drive the vehicle. Thus, the degree of efficiency of the transmission is reduced.

In principle, the shift elements of an automatic transmission may be formed, apart from frictional-locking multi-disk shift elements, as positive-locking shift elements, such as claw shift elements.

In addition, leakage losses arise at sealing points, such as pressurized oil supply lines from the transmission housing through so-called "rotary oil supply lines," which are sealed by means of gap seals, such as slide bearings and/or rectangular rings, in the rotating transmission shaft. This requires an ongoing tracking of the oil pressure in the actuator with a locked shift element or a replenishment of the leakage amount, in order to keep the shift element locked.

In order to make the pressure in the actuator independent from the pressure of the pump and keep the leakage losses to a minimum, the piston chamber may be blocked through various locking mechanisms, such that the pressure remains in the piston chamber and no additional oil must be conveyed. Only during the shifting process is the valve opened and then filled with the corresponding pressure. A hydraulic control device is known from DE 102 05 411 A1 of the applicant; by means of this device, if a torque transfer is desired, the multi-disk shift elements closable through pressurization are locked outside of the shifts by means of a locking device. Thereby, the pressure in the actuating cylinder acting as an actuator, and thus the compression force between the multi-disks, is maintained without hydraulic pressure identical to the actuating pressure of the shift element having to be generated by the gear pump.

Thus, the pressure to be generated by the transmission pump can be reduced relative to the actuating pressure. Although theoretically possible, the pump is not completely switched off or pressureless, since, even with closed and locked shift elements, the need for oil at low pressure continues to exist in the transmission, for example, for cooling and lubrication, or for pre-filling the shift element in preparation for a shifting process.

In this manner, the power consumption of the transmission oil pump, which is calculated as the product of the conveyed volume flow and the generated pressure difference, is significantly reduced. With a lower power consumption of the transmission pump, the overall degree of efficiency of the transmission increases, since less engine power has to be diverted for the hydraulic system and is available to the vehicle drive. A locking device disclosed in this prior art is formed as a stop valve, which is arranged in the feed area of the hydraulic cylinder and tightly blocks the pressure chamber of the cylinder at the pump, such that the hydraulic pressure necessary for maintaining the contact pressure in the multi-disk pack is maintained.

The problem with the existing solution is that, for each shift element, a valve is required; this valve encloses the pressure in each piston chamber, hereinafter also referred to as an actuating pressure chamber. The disadvantage here is that, on one hand, the control pressure must be brought to several different points in the transmission; on the other hand, the possibility of error is significantly higher, since each individual valve can jam, etc. In this manner, the functional reliability of the automatic transmission is disadvantageously affected, since, in special cases, such as during engine standstill, the blocking of the automatic transmission may arise. Thus, the automatic transmission is also blocked against a tow movement. In order to, nevertheless, guarantee functional reliability or detect the position error, position sensors would be necessary for each shift element. In addition, the number of parts is increased by the large number of stop valves. This represents a high expenditure for assembly operations, installation space and costs.

SUMMARY OF THE INVENTION

An exemplary task underlying the invention is to provide a hydraulic control device, by means of which, in a simple and functionally reliable manner, the actuating pressure chamber of a hydraulically actuated shift element can be closed tight or opened back to the hydraulic system. Additional objectives and advantages of the invention set will be set forth in part in the following description, or may be obvious from the description, or may be learned through practice of the invention.

In a hydraulic control device for controlling multiple shift elements transferring torque in an automatic transmission, each of the shift elements features one hydraulic actuator, which includes one actuating pressure chamber. The pressurization of the actuating pressure chamber from the hydraulic control device actuates the shift elements. The hydraulic control device includes at least one shiftable stop valve and at least one hydraulic shift device with multiple pressure adjusting devices allocated to the different shift elements. The hydraulic shift device is connected to its pressure medium supply with a pressure source. The stop valve is shiftable into two shifting positions, where, in a first shifting position of the actuating pressure chamber, at least one shift element is tightly sealed, such that the actuating pressure enclosed in the actuating pressure chamber essentially retains its value regardless of the pressure of the pressure source.

In accordance with an exemplary embodiment of the invention, the stop valve is formed and arranged in such a manner that the actuators of at least two shift elements are hydraulically connectable to the pressure adjusting devices through a common stop valve, where, in a first shifting position of the stop valve, all actuating pressure chambers of the at least two shift elements are tightly sealed by the stop valve. In a second shifting position of the stop valve, all actuating pressure chambers of the at least two shift elements are connected through the stop valve to the pressure adjusting device connected to the respective shift element.

Compared to a solution in which a stop valve is allocated to each shift element, a common stop valve for multiple shift elements is advantageous because errors do not arise due to the jamming of a single valve. All pressure chambers connected to the stop valve are simultaneously opened or closed. Opening a central stop valve ensures that actuating pressure is no longer enclosed in any of the actuating pressure chambers and thus, eliminates the risk that a shift element may still be closed, which could lead, for example, to the blocking of the automatic transmission. In this manner, higher functional reliability is provided. In addition, with a common stop valve, actuating energy need not be placed at various points of the transmission, as with individual stop valves. In this manner, the structural expenditures, and thus the costs, caused by the individually allocated stop valves, are reduced; in addition, each of these mechanisms by itself comprises the same number of elements as the common stop valve in accordance with an exemplary embodiment of the invention.

Advantageously, it is possible that the actuators of all the shift elements are hydraulically connectable to the pressure adjusting devices through a common stop valve. In this manner, a minimum number of parts and assembly expenditure are required.

Preferably, the shift elements are designed in such a manner that they are closed through a pressurization of the actuating pressure chamber, wherein a torque is transferable through the shift element. A pressureless shift element is open and cannot transfer any torque. The "pressureless opened" state is also referred to as "normally opened."

Alternatively, the shift elements may also be formed in such a manner that, with a pressureless actuating pressure chamber, they are closed by the force of a spring and are opened by the pressurization of the actuating pressure chamber. A shift element with such a function is also referred to as "normally closed."

It is possible that, in an automatic transmission, some shift elements are designed as "normally closed" and another part of the shift elements are designed as "normally opened." The different shift element designs are to be distributed to the shift elements in such a manner that, in the event of the loss of the pressure source, the functional reliability of the automatic transmission is maintained.

In one exemplary arrangement of the invention, the stop valve includes a closing body and a housing body, where the closing body is arranged within the housing body. The housing body features at least one port at each actuator of the at least two shift elements and at least one port at the pressure adjusting device, which is connected to the respective one of the at least two shift elements. In this manner, the closing body is movable into a first and a second position by means of an active energy relative to the housing body, where, in the first position, each of the actuators connected to the stop valve is closed. In the second position of the closing body, the actuators of the at least two shift elements are connected through the closing body to the respective pressure adjusting device allocated to the respective shift element. In this manner, the individual actuators, or their actuating pressure chambers, are always separated from each other, and each is pressurized or filled individually with a pressure medium, such as oil, by the pressure adjusting device.

In an exemplary advantageous arrangement, the housing body features a control pressure port, and the active energy for moving the closing body into one of the two positions is hydraulic control pressure acting on the closing body. This pressure is adjustable by the hydraulic shift device, and is guided to the closing body by the control pressure port. The active energy for moving the closing body into the other of the two positions is a preload force of a spring, with a control pressure correspondingly reduced by the hydraulic shift device. This is to be reduced to such an extent that its compression force is smaller than the force of the spring. Such a hydraulic actuation of the stop valve has the advantage that the hydraulic energy already existing in the automatic transmission or the hydraulic control device for actuating the shift elements can be used to adjust the valve. There is no additional expenditure in the form of another form of active energy to be installed.

It is possible that the spring is formed as a compression spring, a tension spring, a cup spring, a coil spring or a wave spring.

Alternatively, it is conceivable that the active energy is pneumatic or electric. With an electric active energy, the closing body can be moved into the two positions by means of electromechanical actuators arranged on both sides of the closing body, or by means of one electromechanical actuator arranged on one side of the closing body and a compression spring arranged on the opposite side.

An exemplary advantageous arrangement of this shows that the closing body is movable, through the use of the control pressure, into the second position, in which the actuating pressure chambers of the at least two shift elements are opened. Under the action of the preload force of the spring, upon a correspondingly reduced control pressure, a pressureless hydraulic system or pressureless pressure source, such as a shut-off engine of a vehicle, the closing body is displaceable into the first position, in which the actuating pressure chambers of the actuators of the at least two shift elements are closed. Such design of a valve is also referred to as "normally closed." If the shift elements are formed in such a manner that they are closed under the actuating pressure and thus can transfer torque, the engaged transmission stage remains in place while the engine is not running, such as with a start-stop operation, and a spontaneous start-up can take place upon a renewed starting of the engine.

Alternatively, it is possible that the closing body is movable into the first position, in which the actuating pressure chambers are closed, under the action of the control pressure, and, under the action of the preload force of the compression spring, along with a correspondingly reduced control pressure or with a pressureless pressure source (such as a stationary pump), is movable into the second position, in which the actuating pressure chambers are opened. Such design of a valve is also referred to as "normally opened." If the shift elements are configured in such a manner that they are closed under pressure, they become open, for example, upon a failure-induced engine standstill, and, advantageously, it can be ruled out with reliability that the automatic transmission will be blocked, since, with pressureless open shift elements, there is no traction between the drive and the output.

Preferably, the closing body is formed as a cylindrical piston valve, which is arranged in a displaceable manner within the housing body. A cylindrical piston valve is a common component in the hydraulic component. Since, in its manufacturing, only one outer contour must be machined, it is advantageously easy to manufacture.

In a preferred exemplary arrangement of the invention, the housing body is a shaft of the transmission.

Alternatively, it is possible that the closing body is formed as a hollow cylindrical sleeve valve, and that the housing body consists of one shaft of the transmission and one transmission housing part concentrically surrounding the shaft. In this manner, the sleeve valve is concentric to the shaft and thus also arranged in a manner axially displaceable at the housing part between the two relative to it. Through the arrangement of the sleeve valve around the shaft, sufficient installation space within the shaft is available for the arrangement of oil passages or valve devices, such as an additional stop valve for at least one additional shift element.

In a particular exemplary arrangement of this alternative, the ports for the actuators are formed in the transmission housing part concentrically surrounding the shaft, and the ports at the hydraulic shift device or at the pressure adjusting devices are formed in the shaft.

In an additional alternative arrangement of the invention, it is provided that the closing body includes multiple tappets connected to the control piston and movable through it, which are arranged in an axially displaceable manner within the housing body, where the number of tappets corresponds to at least the number of connected actuators.

Preferably, with this exemplary arrangement, it is possible that the housing body is a shaft of the transmission and that the ports of the actuators in the shaft are spaced from each other axially with respect to a shaft axis. The tappets are different lengths corresponding to the position of the ports, each in an axial direction starting from the piston valve.

It is possible that, with all arrangements of the closing body, the shaft of the transmission is a central shaft, which is arranged concentrically to the central axis of the automatic transmission. The central axis of the automatic transmission is also the rotational axis of the drive shaft.

In an additional exemplary arrangement of the invention, it is possible that the stop valve is designed as a shiftable seat valve. In contrast to a simple slide valve, a seat valve features a high degree of tightness, such that the pressure trapped in the actuating pressure chamber is essentially not able to decrease over time.

It is possible that the seat valve is formed as a cone valve or as a plate seat valve.

In this connection, it is provided in an exemplary advantageous arrangement that the closing body features an outer contour or an inner contour with multiple cylindrical sections, featuring different inner diameters or outer diameters, such that the outer contour or inner contour is formed in steps. The housing body, within which or on which the closing body is guided in an axially displaceable manner, features a corresponding mating contour formed in steps with different diameters. The closing body and the housing body, at the transitions of adjacent piston sections of different diameters, abut one another in the first position of the closing body, by which a sealing seat is formed at each transition.

In one possible arrangement, it is shown that, with one design of the closing body as a piston valve, the piston valve is formed as a stepped piston, which features multiple piston sections, the respective outer diameters of which vary and increase in steps from one end of the piston valve to the other end. The piston valve features at least as many piston sections of different diameters as the actuators connected to the stop valve. This is guided into a stepped bore formed in the housing body in an axially directed manner, which features, as a mating contour, multiple bore sections of different internal diameters. In this manner, the piston valve is displaceable in the stepped bore for such a distance until the outlets between two piston sections abut one another at the corresponding outlets of the bore sections, and thus form a sealing seat, which corresponds to the first position of the closing body, and by which the actuators are closed.

In an exemplary advantageous arrangement of this variant, it is provided that the housing body is a shaft of the transmission, where the piston valve is arranged in an axial direction of the shaft in a displaceable manner within the shaft. Through this arrangement, the stop valve does not require any installation space whatsoever in the radial direction outside of the shaft, and therefore the size of the automatic transmission is not affected.

In one exemplary arrangement of the closing body as a sleeve valve, it is possible that an inner contour of the sleeve valve is formed as a stepped bore and features multiple bore sections of various inner diameters. In this manner, the sleeve valve is axially guided on an outer contour of the shaft, likewise featuring multiple shaft sections of different diameters, as a mating contour. Both the sleeve valve and the shaft include at least as many bore sections or shaft sections of different diameters as the connected actuators. The sleeve valve is displaceable on the shaft formed in steps in an axial direction for such a distance until the outlets between the bore sections of different diameters abut one another at the corresponding outlets of the shaft sections, and thus form a stop position corresponding to the first position and a sealing seat, by which the actuators are closed. The outer contour of the sleeve valve or the inner contour, as the case may be, of the housing part, which also acts as the housing body, can then be formed cylindrically with a uniform diameter.

Alternatively, it would be possible that the inner contour of the sleeve valve or the outer contour of the shaft acting as the housing body, as the case may be, is formed cylindrically with a uniform diameter. With this exemplary arrangement, the outer contour of the sleeve valve, or the inner contour of the housing part as the mating contour for this, as the case may be, features multiple sections of different diameters.

Advantageously, the number of the sealing seats—and thus the number of cylindrical sections—is greater by one sealing seat than the number of actuators or the ports at their actuating pressure chambers, such that each port is sealed at the actuating pressure chamber of the actuator between two sealing seats.

As an alternative to the specified exemplary arrangements of the stop valve in either one shaft of the transmission or the central shaft, the stop valve may also be arranged directly on the shift element or in the actuating pressure chamber of the shift element.

In a particularly advantageous exemplary arrangement of the piston valve and/or the sleeve valve, as the case may be, it is possible that the closing body is constructed in several pieces, comprising several cylindrical valve sections of different diameters. These cylindrical valve sections—between which elastic compensating elements acting as compression springs are arranged such that, in the first position of the closing body, each valve section is pressed, independent of the other valve sections, through the compensating elements at the respective sealing seat—are guided concentrically in one another and are axially displaceable against each other. In this manner, it is possible to compensate for manufacturing-related tolerances between the closing body and the housing body, as these components form a multiple-fit clearance. The number of fits corresponds to the number of cylindrical sections. In this manner, it may arise that the closing body and the housing body only abut one another at an outlet of the cylindrical sections or at the sealing seat, as the case may be, and all other sealing seats are leaky, as they feature a gap.

In this connection, it is possible that, in the area of the sealing seats on the closing body and/or the housing body, an elastic sealing element is arranged in such a manner that it completes the sealing process itself. Through the elastic sealing elements, the manufacturing tolerances with respect to the axial multiple-fit clearance and the roundness of the cylindrical shape of the sections, characterized by the flatness or surface roughness of the outlets between the cylindrical sections, are adjusted, thus increasing the tightness of the sealing seats.

An automatic transmission for a motor vehicle features the described hydraulic control device, by which functional reliability is increased in the illustrated manner. Advantageously, upon the use of a hydraulic control device in accordance with an exemplary embodiment of the invention, the transmission efficiency is also increased, since, through the maintaining of the actuating pressure independent of the pressure of the motor-driven pressure source or pump outside of the shifts, the pressure to be generated by the pressure source can be reduced. In this manner, a lower amount of engine-generated mechanical power is converted into hydraulic power.

It is possible that the automatic transmission features multiple shift elements, of which at least two are closed in a pressurized manner for the shifting of one transmission stage.

In addition, it may also be provided that an additional shift element is opened under the pressurization of its actuator.

Alternatively or additionally, it is possible that the automatic transmission features at least two shift elements, which are opened under the pressurization of their actuators.

BRIEF DESCRIPTION OF THE DRAWINGS

Exemplary embodiments of the method in accordance with the invention are presented in the drawings, and will be described in more detail below.

The following is shown.

DETAILED DESCRIPTION

Figure 1:
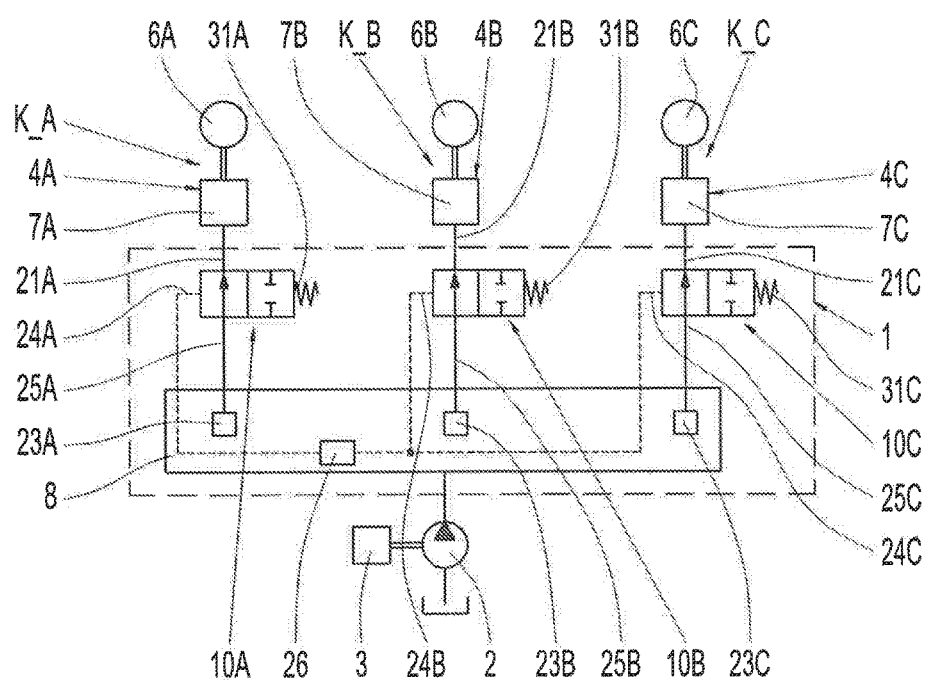
FIG. 1 a hydraulic diagram of a hydraulic control device with a stop valve according to the state of the art.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows the schematic view of a hydraulic control device 1 according to the state of the art, which, in the example shown, is hydraulically connected to three shift elements A, B and C. In principle, at least two shift elements are present in an automatic transmission.

Each shift element comprises one mechanism 6A, 6B, 6C and one actuator 4A, 4B, 4C, which features one actuating pressure chamber 7A, 7B, 7C. The mechanism 6A, 6B, 6C is formed in an automatic transmission, preferably as a multi-disk clutch or in a frictional-locking manner. In principle, a shift element may also be formed in a positive-locking manner and as a clutch (connecting two rotating parts) or a brake (connecting one rotating part with a stationary part). Through the pressurization of the actuating pressure chamber 7A, 7B, 7C, by means of the actuator 4A, 4B, 4C, a mechanical force is exerted on the mechanism 6A, 6B, 6C, by which the respective shift element is actuated; that is, closed or opened. In an automatic transmission, the shift element is typically closed under pressurization, which signifies an advantage in terms of functional reliability, since, upon the failure or standstill, a pump serving as the pressure source opens all of the shift elements, thus avoiding uncertain transmission states.

In known automatic transmissions, the actuator is formed as a hydraulic cylinder, within which a piston is arranged such that an actuating pressure chamber is formed between the piston and cylinder wall. Upon pressurization of the actuating pressure chamber, the pressure acts on the piston, which in turn exerts a mechanical force on the multi-disks of the shift element.

In the example shown, the hydraulic control device 1 comprises a hydraulic shift device 11 and three stop valves 10A, 10B and 10C arranged between the hydraulic shift device 11 and the actuators 4A, 4B, 4C. Each shift element A, B and C is connected to a stop valve 10A, 10B and 10C, and is connected to it in each case through a port 21A, 21B and 21C. The hydraulic shift device 11 comprises four pressure adjusting devices, three of which, pressure adjusting devices 23A, 23B, 23C, are connected to the shift elements A, B and C, and whose supply is hydraulically connected to a pressure medium with a pump 1 driven by a drive motor 3. The fourth pressure adjusting device is a control pressure adjusting device 26, which is connected to the stop valves 10A, 10B and 10C, and adjusts a control pressure p_S. In this exemplary arrangement, all stop valves 10A, 10B and 10C are formed identically and as 2/2-way control valves; that is, they are shiftable into two shifting positions, and each features two pressure ports 21A and 25A, 21B and 25B, 21C and 25C. Through the pressure port 25A, the stop valve 10A is connected to the pressure adjusting device 23A.

Accordingly, the pressure ports 25B and 25C are connected to the pressure adjusting devices 23B and 23C, respectively.

All pressure adjusting devices 23A, 23B, 23C, 26 may, in the areas of a hydraulic system connected to them, adjust a pressure of an ambient pressure p_0 up to a system pressure p_SYS generated by the pump 1. Due to a connection to an area of the hydraulic system, by way of a pressure adjusting device to an area of the automatic transmission in which the ambient pressure p_0 prevails, the relevant area is pressureless, which is also referred to as "vented."

Each stop valve 10A, 10B, 10C features a control pressure port 24A, 24B, 24C, which is connected to a control pressure adjusting device 26, such that all of the stop valves 10A, 10B, 10C are simultaneously to be subjected to the control pressure p_S.

Through the pressurization of the stop valves 10A, 10B, 10C with the control pressure p_S, they are shifted from a first shifting position, in which the actuating pressure chamber 7A, 7B, 7C of the respective actuator 4A, 4B, 4C is closed, counter to the force of a spring 31A, 31B, 31C, into a second shifting position, which is shown in the illustration. In the second shifting position, the actuating pressure chambers 7A, 7B, 7C of the shift elements A, B, C are connected through the ports 21A, 21B and 21C to the pressure adjusting devices 23A, 23B, 23C of the hydraulic shift device 11. The stop valve occupies this second shifting position, for example, during the shifting process for effecting a gear change. For a shift element that is to be pressurized or closed for a gear change, in the pressure adjusting device connected to the shift element through the stop valve, a so-called clutch valve pressure p_V is adjusted, corresponding to the clutch pressure p_K, which is subjected to the corresponding actuating pressure chamber. The actuator of a shift element that is to be opened is shifted without pressure by the corresponding pressure adjusting device. This exemplary arrangement of a stop valve, which is closed in the pressureless state of the hydraulic control device or upon a standstill of the pump, is also referred to as "normally closed."

In principle, it is also possible to design the stop valve in such a manner that, through the pressurization of the control pressure port with the control pressure, the stop valve or the actuating pressure chamber, as the case may be, is closed, and is open under the action of the spring with a correspondingly reduced control pressure ("normally opened").

If the shift is terminated, the control pressure ports 24A, 24B, 24C of the stop valves 10A, 10B, 10C are vented through the control pressure adjusting device 26, by which the spring 31A, 31B, 31C shifts the stop valve into the first shifting position, such that the clutch pressure p_K is enclosed in the actuating pressure chamber and remains at its level independent of the system pressure p_SYS such that the shift element is closed and the respective transmission stage remains engaged with it. The system pressure p_SYS generated by the pump 1 can now be reduced, such that the power consumption of the pump decreases and the degree of efficiency of the automatic transmission increases.

Figure 2:
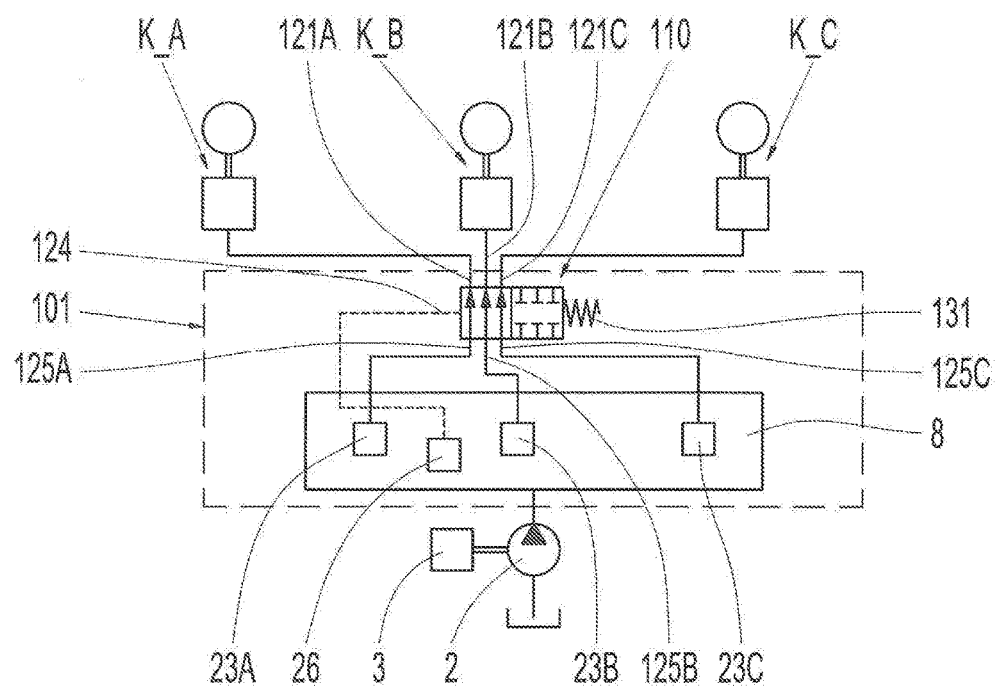
FIG. 2 a hydraulic diagram of a hydraulic control device in accordance with an exemplary embodiment of the invention.

FIG. 2 shows a hydraulic diagram of a hydraulic control device 101 in accordance with an exemplary embodiment of the invention. Thereby, all the shift elements A, B, C are connectable by a common stop valve 110 to the hydraulic shift device 111. In the exemplary arrangement shown, the stop valve 110 is formed as a 2/6-way control valve; that is, it can be shifted into two shifting positions and features six pressure ports 121A, 121B, 121C, 125A, 125B, 125C. In general, the number of pressure ports at a stop valve in accordance with exemplary aspects of the invention corresponds to twice the number of the shift elements. In addition to the pressure ports, the stop valve 110 features a control pressure port 124, which is connected to a control pressure adjusting device 126, through which the stop valve 110 can be subjected to a control pressure p_S.

In the exemplary embodiment shown, the stop valve 110 is designed as "normally closed"; that is, if the control pressure port 124 is vented through the control pressure adjusting device 126, or the control pressure p_S falls below a certain pressure value, the stop valve 110 is shifted by the force of a spring 131 into a second shifting position, in which the stop valve 110 is closed. In this manner, the hydraulic connection between the shift elements A, B, C, or their actuating pressure chambers and the pressure adjusting devices 23A, 23B, 23C is interrupted, and the actuating pressure chambers 7A, 7B, 7C are closed. In principle, the stop valve may also be designed as "normally opened." In order to keep the clutch pressure p_K enclosed in one or more actuating pressure chambers constant, the stop valve 110 must be designed in such a manner that it tightly closes; that is, it does not permit any leakage of an operating medium. In addition, no leakage points between the stop valve 110 and the respective actuating pressure chamber may be present.

Advantageously, with a hydraulic control device 101 in accordance with an exemplary embodiment of the invention, all shift elements A, B, C, or their actuating pressure chambers 7A, 7B, 7C, as the case may be, are necessarily simultaneously closed or opened by means of the stop valve 110. The jamming of a single stop valve is not possible. Moreover, with the hydraulic control device in accordance with exemplary aspects of the invention, the number of components, and thus the costs, compared to the state of the art are significantly reduced.

Figure 3A:
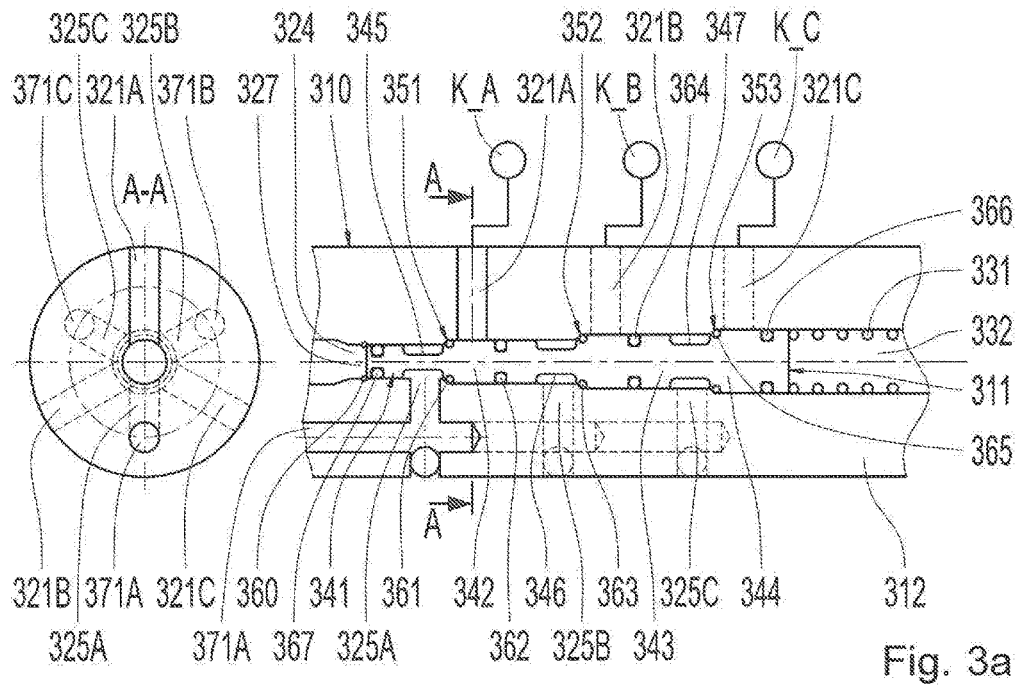
FIG. 3a a first exemplary arrangement of a stop valve in accordance with the invention in a first shifting position.

FIG. 3a shows a longitudinal cut of a first arrangement of a stop valve 310 in accordance with an exemplary embodiment of the invention in the first shifting position, along with a cross-cut A-A for illustrating the location of certain features, which have been rotated in longitudinal cut in the drawing plane. In this exemplary embodiment and in the subsequent figures, the stop valve 310 is connected to three shift elements K_A, K_B and K_C. In this manner, the stop valve 310 features a closing body formed as a piston valve 311, which is guided in a displaceable manner in a housing body formed as a central shaft 312 of an automatic transmission into a stepped bore 314 between two positions.

The piston valve 311 features four cylindrical piston sections 341, 342, 343 and 344, where the diameter of the piston sections increases in steps starting from the piston section 341. A recess 345 is formed between the adjacent piston sections 341 and 342, while a recess 346 is formed between the piston sections 342 and 343, and a recess 347 is formed between the piston sections 343 and 344. The term "recess" refers to a gap or a material cavity between the piston sections and not an outer contour of the piston valve.

Figure 3B:
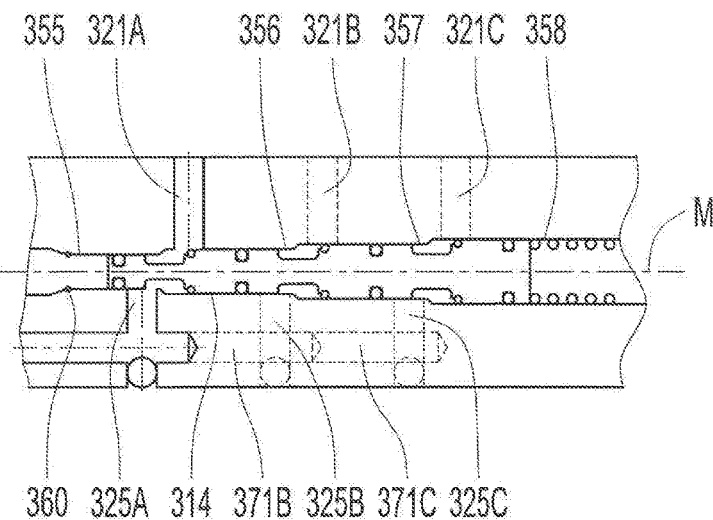
FIG. 3b a first exemplary arrangement of a stop valve in accordance with the invention in a second shifting position.

As the mating contour for the piston valve 311 is formed in steps, the stepped bore 314 is also formed with four bore sections 355, 356, 357 and 358, which, for clarity, are referred to in FIG. 3b. In each case, a sealing seat 351, 352 and 353 is formed in the transitions between the three outlets forming the four individual bore sections. In this manner, the sealing seat (that is, the transition) may be formed in a cone-shaped or stepped form; that is, without an axial extension of the transition. Alternatively or simultaneously, it would also be possible to design the transitions between the piston sections in conical form.

In the central shaft 312, the clutch ports 321A, 321B and 321C are formed in the form of bores going out radially from the stepped bore 314, which connect the stop valve 310 to the respective shift elements K_A, K_B and K_C and, within the length of the bore sections 356, 357 and 358, open into the stepped bore 314. The clutch ports 321A, 321B and 321C are, as shown from the cut A-A, turned against each other and, for purposes of illustration, rotated in longitudinal cut in the drawing plane. Theoretically, however, it would also be possible to arrange the clutch ports 321A, 321B and 321C in one plane, since penetration is ruled out.

Within the length of the bore sections 355, 356 and 357, an axially offset pressure port 325A, 325B and 325C opens at the clutch ports 321A, 321B and 321C, respectively. The stop valve 310 features a control pressure port 324, which is connected to the bore section with the smallest diameter, in this case the bore section 355. In the bore section 355, a control pressure chamber 327 is formed; this is connected to a control pressure adjusting device through the control pressure port 324. In this manner, the piston valve 311 can be subjected to a control pressure p_S. In the bore section 358 that features the largest diameter, a spring chamber 332 is formed, in which a spring 331 is guided. The spring chamber 332 is pressureless.

In FIG. 3a, the piston valve 311 is located in a first shifting position, which is occupied under the action of the spring 331 preloaded between the central shaft 312 and the piston valve 311, if the control pressure chamber 327 is pressureless or the control pressure p_S exerts a smaller force on the piston valve 311 than the spring 331. In the first shifting position, the piston sections 342, 343 and 344 of the piston valve 311 abut the sealing seats 351, 352 and 353. Depending on the geometric design of the sealing seats, the stop valve 310 may be designed as a cone valve or, with a stepped transition, as a plate seat valve. The sealing seats are required for a secure sealing of the respective actuating pressure chamber, since, due to the design, a piston valve forms a sealing gap with the bore in which it is guided. In the first shifting position of the piston valve 311, the clutch ports 21A, 21B and 21C are sealed off between either the sealing seat 351 and an elastic sealing element 362, the sealing seat 352 and an elastic sealing element 364, or the sealing seat 353 and an elastic sealing element 366 at the pressure ports 325A, 325B, 325C. At the control pressure chamber 327, an additional sealing element 360 is arranged, to which the piston valve 311 in the first shifting position abuts.

In addition, in the area of the sealing seats, the piston valve 311 features an elastic sealing element 361 on the piston section 342, an elastic sealing element 363 on the piston section 343, and an elastic sealing element 365 on the piston section 344. Such sealing elements compensate for manufacturing-related tolerances concerning surface roughness or a lack of roundness of the seal seat. On the other hand, the stepped bore 314 and the piston valve 311, or sections thereof, have tolerances concerning their axial locations, such that only one piston section securely abuts a sealing seat, while a gap exists with the other sealing seats. Such gaps are closed through the elastic sealing elements 361, 363 and 365. The control pressure chamber 327 is sealed at the pressure port 325A by an elastic sealing element 367.

FIG. 3b shows the piston valve 311 in the second shifting position, in which the actuating pressure chambers of the shift elements are connected to the respective pressure adjusting devices. From a control pressure adjusting device (not shown), the control pressure chamber 327 is subjected to the control pressure p_S, which moves the piston valve 311 against the force of the spring 331 into the second shifting position.

The clutch port 325A, connected to the associated pressure adjusting device (not shown) through an axially directed supply channel 371A formed in the central shaft 312, is in contact with the clutch port 321A through the recess 345, such that the pressure adjusting device can fill the actuating pressure chamber of the shift element or can be subjected to a clutch pressure. Accordingly, the pressure ports 325B and 325C are also connected to the clutch ports 321B and 321C through the recesses 346 and 347. The pressure port 325B is connected to its respective pressure adjusting device through a supply channel 371B, and the pressure port 325C is connected to its respective pressure adjusting device through a supply channel 371C. In the longitudinal cuts of FIGS. 3a and 3b, the feed channels 371A, 371B and 371C are rotated in a drawing plane. However, since the feed channels would be penetrated, these are actually evenly offset around the circumference, as shown in the cut A-A. It also follows from the sectional view A-A that the pressure ports 325A, 325B and 325C, which are connected to the feed channels 371A, 371B and 371C, are offset to each other around the circumference.

Figure 4A:
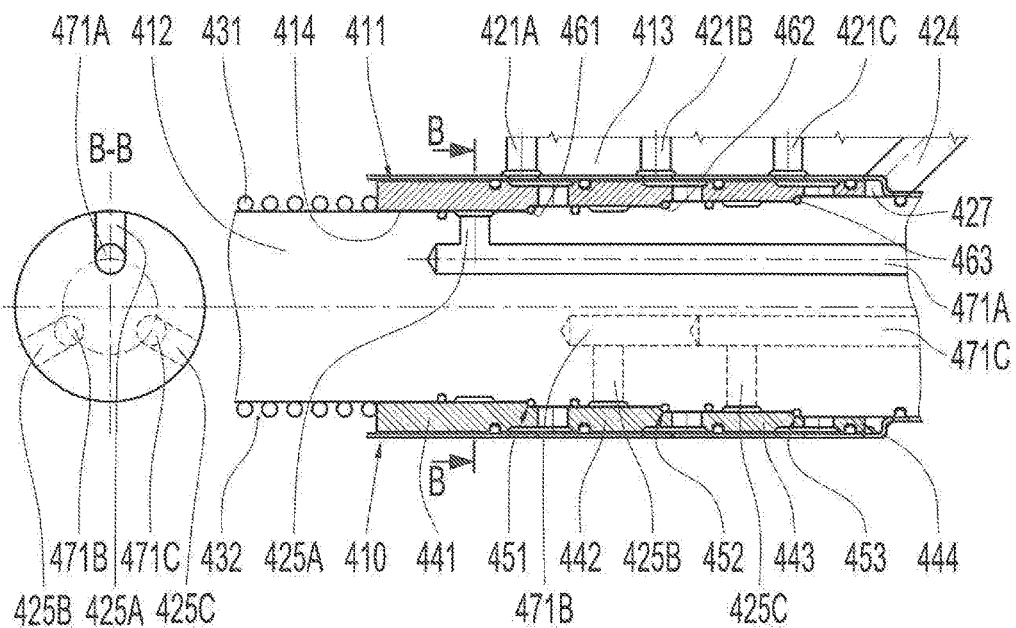
FIG. 4a a second exemplary arrangement of a stop valve in accordance with the invention in a first shifting position.

FIG. 4a shows an alternative arrangement of a stop valve 410 in accordance with an exemplary embodiment of the invention in longitudinal cut with respect to a central axis M of a central shaft 412, which forms a part of a housing body. In this manner, a closing body is designed as a tube-shaped, hollow cylindrical sleeve valve 411, which is arranged concentrically at the central axis M between the central shaft 412 and a transmission housing part 413 as an additional part of the housing body, and is displaceable in an axial direction between two shifting positions.

On an inner contour of the sleeve valve 411, a stepped bore 414 is formed, such that the sleeve valve 411 features four sleeve sections 441, 442, 443, and 444, with a cylindrical inner contour. The inner diameters of the sleeve sections increase in steps starting from the sleeve section 441 up to the sleeve section 444. The center shaft 412 features, as mating contours for the stepped bore 414 of the sleeve valve 411, four cylindrical shaft sections 475, 476, 477 and 478 of different diameters on its outer contour. In each of the shaft sections 475, 476 and 477, a recess 455, 456 and 457 is formed, where the term "recess" refers to a gap or a material cavity in the outer contour of the central shaft 412, and not to the shape of the outer contour.

In the transmission housing part 413, three clutch ports 421A, 421B and 421C are formed. In the central shaft 412, three pressure ports 425A, 425B and 425C are formed, each of which is connected to a pressure adjusting device through an axially directed supply channel 471A, 471B, or 471C, as the case may be. For purposes of illustration, the supply channels 471A, 471B and 471C and the pressure ports 425A, 425B and 425C are in longitudinal cut, all in the drawing plane, but this is technically infeasible, since the supply channels would be penetrated. The sectional view B-B shows the actual arrangement of the supply channels 471A, 471B and 471C along with each pressure port 425A, 425B and 425C connected to them within the central shaft 412.

The sleeve valve 411 features at least three passages 445, 446 and 447, by which, in a second shifting position of the sleeve valve 411, the clutch ports 421A, 421B, 421C are connected to the pressure ports 425A, 425B, 425C. It may be distributed around the circumference at multiple passages at each of the axial positions of the passages 445, 446 and 447.

In the transmission housing part 413, at one end of sleeve valve 411, the stop valve 410 features a control pressure chamber 427, which is connected through a control pressure port 424 to a control pressure adjusting device (not shown) for adjusting a control pressure p_S. At the other end of the sleeve valve 411, a spring 431 is arranged in a preloaded manner between the housing body and the sleeve valve 411.

In the first shifting position, sleeve valve 411 abuts with the inner ends of its sleeve sections 441, 442 and 443 and the transitions between the shaft sections 475, 476, 477 and 478, where the transitions form the sealing seats 451, 452 and 453. For the purpose of tolerance compensation, as described under FIGS. 3a and 3b, an elastic sealing element 461, 462 and 463 is arranged on the central shaft 412 in the area of the sealing seats 451, 452 and 453. For sealing between two adjacent clutch ports, elastic sealing elements 464, 466 and 467 are arranged in a radially tight manner on the central shaft 412. At the cylindrical outer contour of the sleeve valve 411, elastic sealing elements 465 are arranged, in a manner radially tight at the transmission housing part 413, between the passages 445, 446 and 447 and the respective end of the sleeve valve 411. In principle, the sealing elements may be arranged either on the central shaft 412 or the sleeve valve 411.

With a vented control pressure chamber 427, the first shifting position of the sleeve valve 411 is occupied under the action of the preloaded spring 431. In this shifting position, the clutch ports 421A, 421B and 421C are sealed tight.

Figure 4B:
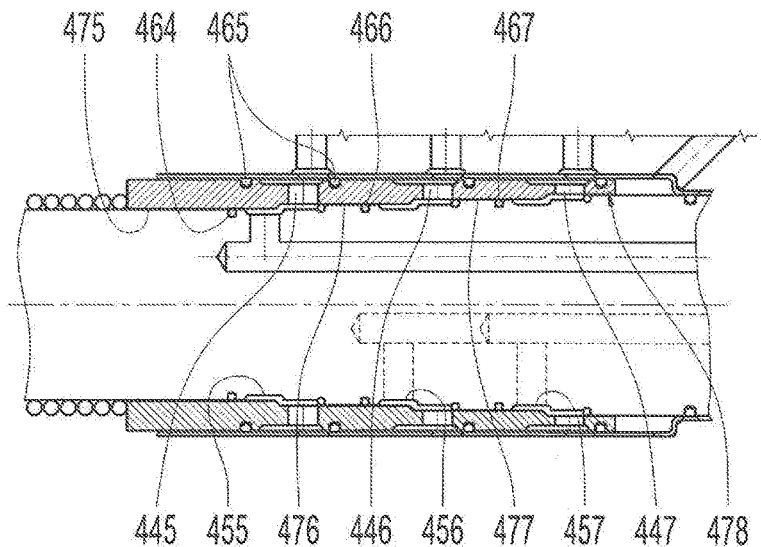
FIG. 4b a second exemplary arrangement of a stop valve in accordance with the invention in a second shifting position.

FIG. 4b shows the stop valve 410 with the sleeve valve 411, which has been moved into the second shifting position under the action of a control pressure p_S against the force of the spring 431. The clutch ports 421A, 421B and 421C are connected to the pressure ports 425A, 425B and 425C through the passages 445, 446 and 447 and the recesses 455, 456 and 457, such that the actuating pressure chambers of the shift element (not shown) are filled or can be subjected to a clutch pressure p_K.

Figure 5A:
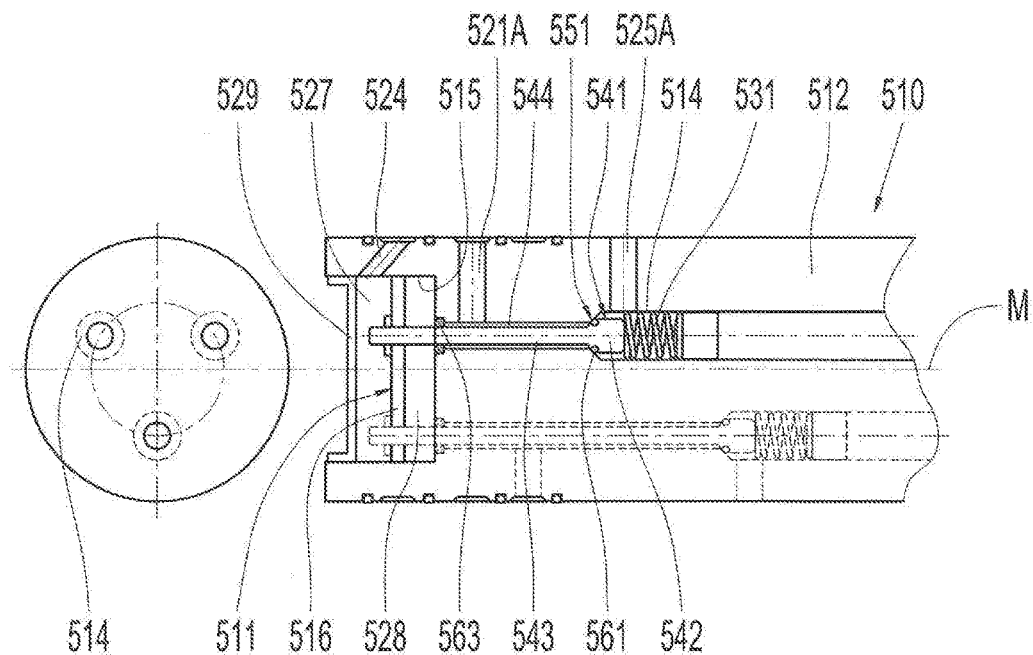
FIG. 5a a third exemplary arrangement of a stop valve in accordance with the invention in a first shifting position.

FIG. 5a shows a longitudinal cut of an additional exemplary arrangement of a stop valve 510 in the first shifting position. Thereby, a closing body is designed in multiple parts as a tappet valve 511, which is displaceable within a central shaft 512 axially with respect to a central axis M of the central shaft 512 between two shifting positions.

Thereby, the tappet valve 511 comprises one control piston 516 and three tappets of different lengths fixed thereon. Due to the arrangement of the three tappets within the central shaft 512, only one tappet 541 is shown in a manner rotated in the drawing plane. Since all tappets are identically constructed on the different lengths, their construction and operation will be described only regarding the tappet 541. The number of the tappets corresponds to the number of shift elements connected to the stop valve 510. In the illustration of FIG. 5a, an additional tappet of a different length is shown in broken lines. In addition, a schematic cut shows the location of three tappets along the circumference of the central shaft 512.

The control piston 516 is guided in an axially displaceable manner in a cylinder bore 515 concentric to the center axis M. The cylinder bore 515 is closed in a pressure-tight manner with a sealing plate 529. In this connection, a pressure-tight seal is to be understood such that, at such a point, even under pressurization with the actuating pressure provided for it, no leakage can flow into the extension of the valve bore 514 from the spring chamber 532. Between the control piston 516 and the sealing plate 529, a control pressure chamber 527 is formed; this is connected through a control pressure port 524 to a control pressure actuating device (not shown), from which it can be subjected to a control pressure p_S. Between the control piston 516 and the end of the cylinder bore 515 formed as a blind hole, a vented compensating pressure chamber 528 is formed, in which an ambient pressure p_0 prevails.

The tappet 541 is arranged in an axially directed valve bore 514. In this manner, the valve bore 514 features two bore sections 555 and 556 of different diameters, at the transition of which a conical sealing seat 551 is formed. Alternatively, this transition could be formed in steps. The tappet 541 features two valve sections 542 and 543 of different diameters, where the valve section 542, having the larger diameter in the first shifting position, abuts the sealing seat 551. A clutch port 521A opens into the bore section 556, which features a smaller diameter than the bore section 555; this is connected to an actuating pressure chamber of a shift element K_A (not shown). A pressure port 525A opens into the bore section 555; this is connected to a pressure adjusting device (not shown) for the shift element K_A (likewise not shown). Between the end of the tappet 541 at the valve section 542 and a sealing plug 558, a spring 531 is arranged in a spring chamber 532 in the bore section 555; this is also preloaded in the first shifting position of the tappet 541. The sealing plug 558 is firmly connected to the central shaft 512 and seals the spring chamber 532. The pressure in the spring chamber 532 is adjusted by the pressure port 525A of the respective pressure adjusting device (not shown).

If the control pressure chamber 527 is pressureless, the tappet 541 is pressed into the first shifting position by the force action of the spring 531 against the sealing seat 551. Analogously, this applies to the other two tappets that are connected to the tappet 541 through the control piston 516. The coupling is such that the tappet and the control piston 516 cannot be displaced against each other in an axial direction. The sealing effect between the valve section 542 and the sealing seat 551 is increased through an elastic sealing element 561, which is delegated to the valve section 542. Alternatively, the sealing element 561 may also be arranged on the sealing seat 551. An additional radially acting elastic sealing element 563 is arranged at the end of the bore section 556 for the compensating pressure chamber 528 between the valve section 543 and surrounding central shaft 512. The difference between an inner diameter of the bore section 556 or the bore section 555, as the case may be, and the outer diameter of the valve section 543 or the valve section 542, as the case may be, is selected in such a large scope that a hollow cylindrical passage 544 is formed as an annular cross-section that can be freely flowed through.

Thus, in the first shifting position, the clutch port 521A and an actuator pressure chamber (not shown) of a shift element K_A are sealed by the tappet 541 along with the sealing elements 561 and 563.

Figure 5B:
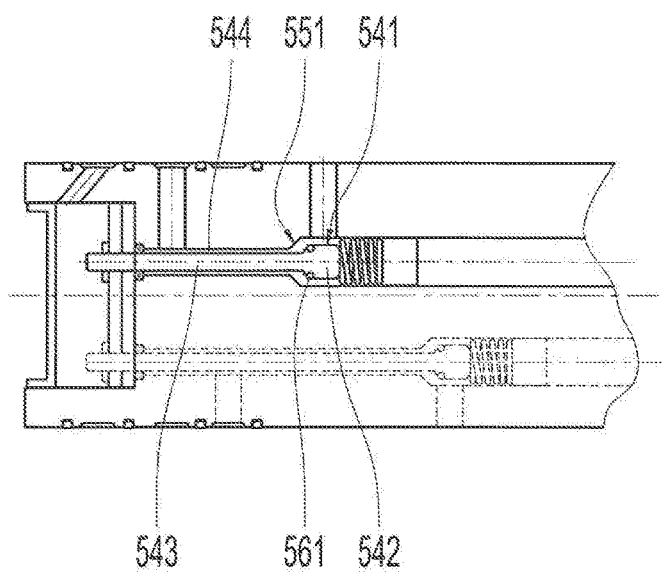
FIG. 5b a third exemplary arrangement of a stop valve in accordance with the invention in a second shifting position.

FIG. 5b shows the tappet valve 511 of the stop valve 510 in the second shifting position. Thereby, the control pressure chamber 527 is subjected to the control pressure p_S through the control pressure port 524, by which the control piston 516 and the tappet 541, are displaced into the second shifting position against the force of the spring 531. The valve section 542 no longer makes contact at the sealing seat 551, and the clutch port 521A is connected through the passage 544 and the spring pressure chamber 532 to the pressure port 525A. Analogously, this also applies to the other two tappets (not shown) or the other two shift elements K_B and K_C.

Modifications and variations can be made to the embodiments illustrated or described herein without departing from the scope and spirit of the invention as set forth in the appended claims.

1 Hydraulic control device
2 Pump, pressure source
3 Drive motor
8 Hydraulic shift device 4A Actuator of the shift element A
4B Actuator of the shift element B
4C Actuator of the shift element C
6A Mechanism of the shift element A
6B Mechanism of the shift element B
6C Mechanism of the shift element C
7A Actuating pressure chamber of the shift element A
7B Actuating pressure chamber of the shift element B
7C Actuating pressure chamber of the shift element C
10A Stop valve
10B Stop valve
10C Stop valve
21A Pressure port
21B Pressure port
21C Pressure port
23A Pressure adjusting device
23B Pressure adjusting device
23C Pressure adjusting device
24A Control pressure port
24B Control pressure port
24C Control pressure port
25A Pressure port
25B Pressure port
25C Pressure port
101 Hydraulic control device
110 Stop valve
121A Pressure port
121B Pressure port
121C Pressure port
124 Control pressure port
125A Pressure port
125B Pressure port
125C Pressure port
131 Spring
310 Stop valve
311 Closing body, piston valve
312 Central shaft, housing body
314 Stepped bore
321A Clutch pressure port
321B Clutch pressure port
321C Clutch pressure port
324 Control pressure port
325A Pressure port
325B Pressure port
325C Pressure port
327 Control pressure chamber
331 Spring
332 Spring chamber
341 Piston section
342 Piston section
343 Piston section
344 Piston section
345 Recess
346 Recess
347 Recess
351 Sealing seat
352 Sealing seat
353 Sealing seat
355 Bore section
356 Bore section
357 Bore section
358 Bore section
360 Sealing element
361 Sealing element
362 Sealing element
363 Sealing element
364 Sealing element
365 Sealing element
366 Sealing element
367 Sealing element
371A Supply channel
371B Supply channel
371C Supply channel
410 Stop valve
411 Closing body, sleeve valve
412 Central shaft, housing body
413 Housing part, housing body
414 Stepped bore
421A Pressure port
421B Pressure port
421C Pressure port
424 Control pressure port
425A Pressure port
425B Pressure port
425C Pressure port
427 Control pressure chamber
431 Spring
432 Spring chamber
441 Sleeve section
442 Sleeve section
443 Sleeve section
444 Sleeve section
445 Passage
446 Passage
447 Passage
451 Sealing seat
452 Sealing seat
453 Sealing seat
455 Recess
456 Recess
457 Recess
461 Sealing element
462 Sealing element
463 Sealing element
464 Sealing element
465 Sealing element
466 Sealing element
467 Sealing element
471A Supply channel
471B Supply channel
471C Supply channel
475 Shaft section
476 Shaft section
477 Shaft section
478 Shaft section
510 Stop valve
511 Closing body, tappet valve
512 Central shaft, housing body
514 Valve bore
515 Cylinder bore
516 Control piston
521A Clutch port
521B Clutch port
524 Control pressure port
525A Pressure port
525B Pressure port
527 Control pressure chamber
531 Spring
532 Spring chamber
541 Tappet
542 Valve section
543 Valve section
544 Passage
551 Sealing seat 555 Bore section
556 Bore section
561 Sealing element
563 Sealing element
K_A Shift element, dutch
K_B Shift element, clutch
K_C Shift element, clutch
p_0 Ambient pressure
p_K Clutch pressure
p_S Control pressure
p_SYS System pressure
p_V Clutch valve pressure

The invention claimed is:

1. A hydraulic control device for controlling a plurality of multiple shift elements in an automatic transmission, each shift element of the plurality of shift elements comprising at least one hydraulic actuator having an actuating pressure chamber, the hydraulic control device comprising
a shiftable stop valve; and
a hydraulic shift device connected to a pressure source with a plurality of pressure adjusting devices, each pressure adjusting device of the plurality of pressure adjusting devices fluidly coupled to a respective shift element of the plurality of shift elements,
wherein the shiftable stop valve is formed and arranged such that the hydraulic actuators of at least two shift elements of the plurality of shift elements are hydraulically connectable to the respective pressure adjusting devices of the plurality of pressure adjusting devices through the shiftable stop valve,
wherein, in a first shifting position of the shiftable stop valve, all actuating pressure chambers of the at least two shift elements are sealed by the shiftable stop valve, and, in a second shifting position of the shiftable stop valve, all actuating pressure chambers of the at least two shift elements are connected through the shiftable stop valve to the respective pressure adjusting devices of the plurality of pressure adjusting devices.

2. The hydraulic control device of claim 1, wherein the shiftable stop valve comprises a closing body and a housing body, the closing body disposed within the housing body, the housing body defining at least one port to each hydraulic actuator of the at least two shift elements and at least one port to the respective pressure adjusting devices of the plurality of pressure adjusting devices, the closing body movable into a first and a second position relative to the housing body, each of the hydraulic actuators connected to the shiftable stop valve being closed in the first position, the hydraulic actuators of the at least two shift elements connected to the respective pressure adjusting devices of the plurality of pressure adjusting devices through the closing body in the second position.

3. The hydraulic control device of claim 2, wherein the housing body defines a control pressure port, the closing body movable into one of the first and second positions with hydraulic control pressure acting on the closing body, the hydraulic control pressure adjustable by the hydraulic shift device, the closing body movable into the other of the first and second positions by a spring that is coupled to the closing body.

4. The hydraulic control device of claim 3, wherein the closing body is movable into the second position with the hydraulic control pressure, the closing body movable into the first position with the spring and a corresponding reduced hydraulic control pressure.

5. The hydraulic control device of claim 2, wherein the closing body is a cylindrical piston valve, the cylindrical piston valve disposed within the housing body.

6. The hydraulic control device of claim 5, wherein the shiftable stop valve is a shiftable seat valve.

7. The hydraulic control device of claim 5, wherein the piston valve is formed as a stepped piston, the stepped piston comprising a plurality of piston sections, each piston section of the plurality of piston sections having a respective outer diameter, the outer diameters of the piston sections varying and increasing from one end of the piston valve to the other end of the piston valve, the piston valve having at least as many piston sections as hydraulic actuators of the at least two shift elements, the piston valve received within a stepped bore formed in the housing body, the stepped bore having a mating contour with a plurality of bore sections, each bore section of the plurality of bore sections having a respective internal diameter, the piston valve displaceable within the stepped bore such that outlets between two piston sections abut one another at corresponding outlets of the bore sections and form a sealing seat at the first position of the piston valve.

8. The hydraulic control device of claim 7, wherein the closing body comprises a plurality of cylindrical valve sections, each cylindrical valve section of the plurality of cylindrical valve sections having a respective diameter, the cylindrical valve sections of the plurality of cylindrical valve sections disposed concentrically within one another around a central axis of the shaft, the cylindrical valve sections of the plurality of cylindrical valve sections axially displaceable relative to each other and between which elastic compression springs are disposed, each cylindrical valve section of the plurality of cylindrical valve sections pressed through the elastic compression springs at the respective sealing seat in the first position of the closing body.

9. The hydraulic control device of claim 7, wherein at least one elastic seal is disposed proximate the sealing seats on the closing body or the housing body.

10. The hydraulic control device of claim 5, wherein the housing body is a shaft of the automatic transmission, the piston valve axially displaceable within the shaft.

11. The hydraulic control device of claim 2, wherein the closing body is a hollow cylindrical sleeve valve, the housing body comprising a shaft of the automatic transmission and a transmission housing part concentrically surrounding the shaft, the hollow cylindrical sleeve valve being concentric with the shaft, the hollow cylindrical sleeve valve being axially displaceable between the shaft and the transmission housing part.

12. The hydraulic control device of claim 11, wherein an inner contour of the hollow cylindrical sleeve valve is a stepped bore having a plurality of sleeve sections, each sleeve section of the plurality of sleeve sections having a respective inner diameter, the hollow cylindrical sleeve valve received on an outer contour of the shaft, the shaft having a plurality of shaft sections, each shaft section of the plurality of shaft sections having a respective diameter, the hollow cylindrical sleeve valve having at least as many sleeve sections as hydraulic actuators of the at least two shift elements, the hollow cylindrical sleeve valve displaceable on the shaft such that outlets between the sleeve sections of the plurality of sleeve sections abut one another at corresponding outlets of the shaft sections of the plurality of shaft section and a sealing seat at the first position.

13. The hydraulic control device of claim 2, wherein the closing body comprises a plurality of tappets connected to a control piston, the plurality of tappets axially displaceable manner within the housing body, a number of tappets of the plurality of tappets corresponding to at least a number of the hydraulic actuators of at least two shift elements of the plurality of shift elements.

14. The hydraulic control device of claim 13, wherein the housing body is a shaft of the automatic transmission, ports of the actuators in the shaft axially spaced from each other, each tappets of the plurality of tappets having a respective axial length from the piston valve.

15. An automatic transmission comprising:
a plurality of multiple shift elements, each shift element of the plurality of shift elements comprising at least one hydraulic actuator having an actuating pressure chamber;
a shiftable stop valve; and
a hydraulic shift device connected to a pressure source with a plurality of pressure adjusting devices, each pressure adjusting device of the plurality of pressure adjusting devices fluidly coupled to a respective shift element of the plurality of shift elements,
wherein the stop valve is formed and arranged such that the hydraulic actuators of at least two shift elements of the plurality of shift elements are hydraulically connectable to the respective pressure adjusting devices of the plurality of pressure adjusting devices through the shiftable stop valve,
wherein, in a first shifting position of the shiftable stop valve, all actuating pressure chambers of the at least two shift elements are sealed by the shiftable stop valve, and, in a second shifting position of the shiftable stop valve, all actuating pressure chambers of the at least two shift elements are connected through the shiftable stop valve to the respective pressure adjusting devices of the plurality of pressure adjusting devices.

16. The automatic transmission of claim 15, wherein the at least two shift elements are closed in a gear of the automatic transmission.

17. The automatic transmission of claim 15, wherein at least one additional shift element of the plurality of shift elements is opened when the hydraulic actuator of the at least one additional shift element is pressurized.

18. The automatic transmission of claim 15, wherein at least two additional shift elements of the plurality of shift elements are opened when the hydraulic actuators of the at least two additional shift elements are pressurized.

* * * * *